Figure 1:
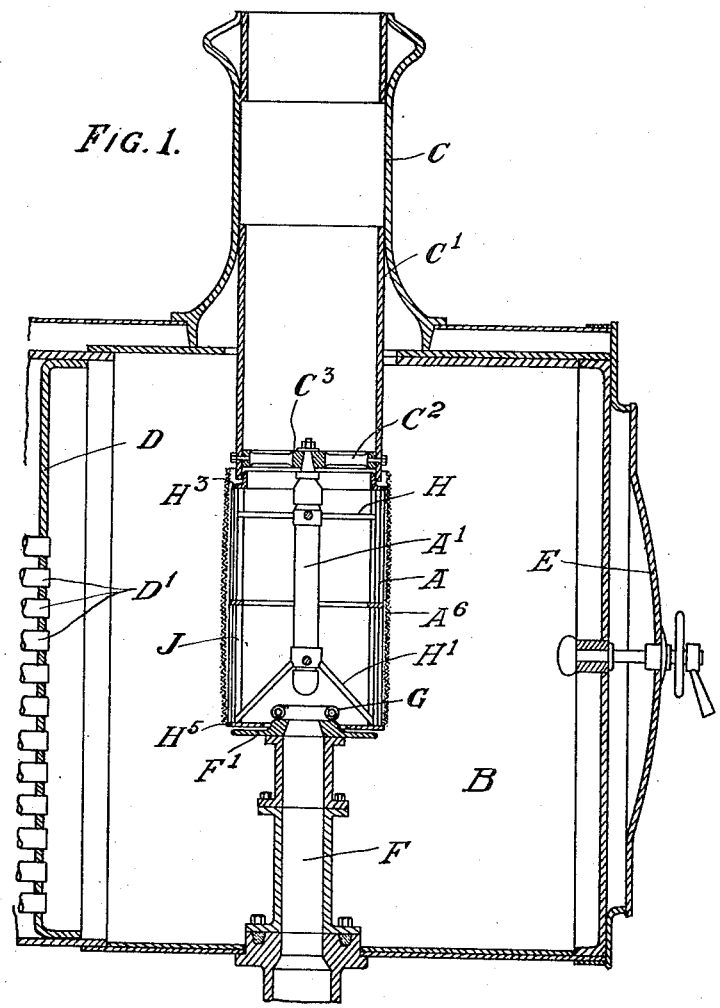

P. C. SACCAGGIO & F. A. LAGRANGE.
SPARK ARRESTER.
APPLICATION FILED APR. 13, 1914.

1,125,727.

Patented Jan. 19, 1915.
3 SHEETS—SHEET 1.

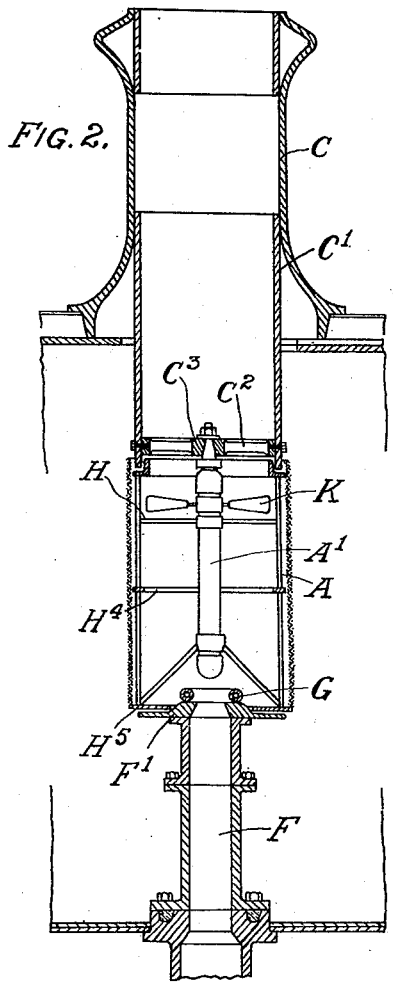
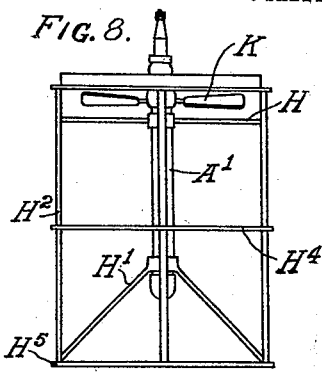
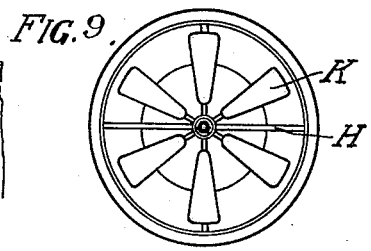
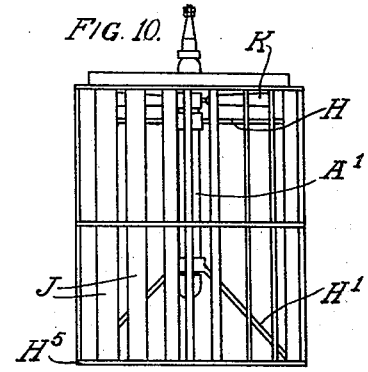
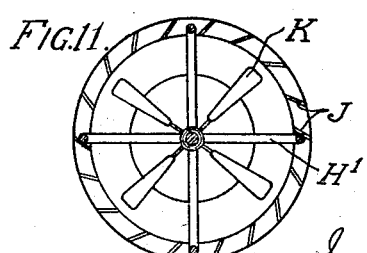

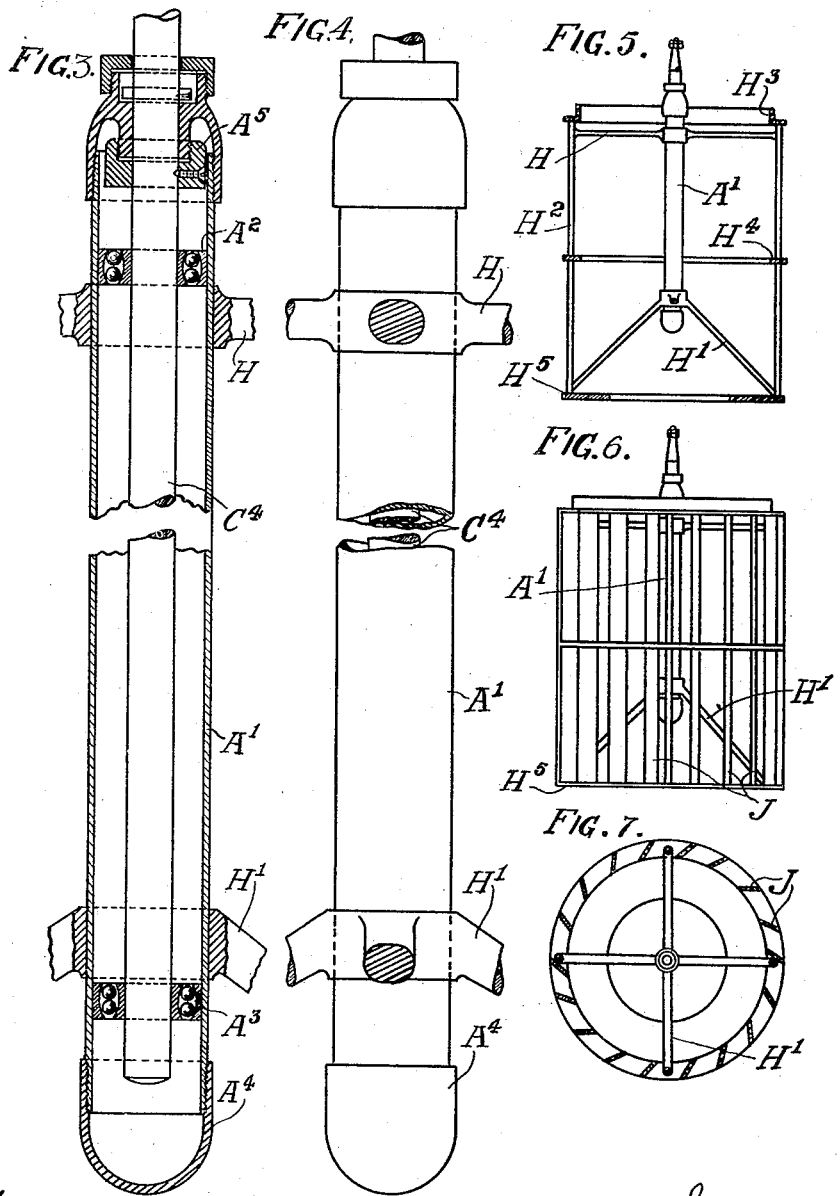

UNITED STATES PATENT OFFICE.

PEDRO CELESTINO SACCAGGIO AND FEDERICO ALEJANDRO LAGRANGE, OF BUENOS AIRES, ARGENTINA.

SPARK-ARRESTER.

1,125,727.   Specification of Letters Patent.   Patented Jan. 19, 1915.

Application filed April 13, 1914. Serial No. 831,426.

*To all whom it may concern:*

Be it known that we, PEDRO CELESTINO SACCAGGIO and FEDERICO ALEJANDRO LAGRANGE, residing at Buenos Aires, Argentina (whose post-office address is Calle Cangallo No. 876, Buenos Aires, Argentina), have invented certain new and useful Improvements Relating to Spark-Arresters; and we do hereby declare the following to be a full, clear, and exact description of the invention, such as will enable others skilled in the art to which it appertains to make and use the same.

This invention is for improvements in or relating to spark arresters such as are used in steam locomotive, or stationary engines, to prevent the scattering of hot cinders which involve the risk of fire.

The present invention consists in the combination in locomotive or other engines of a chamber such as the smoke-box between the furnace and the outlet for the products of combustion, a screen disposed in this chamber at the inner or intake end of the outlet and means for maintaining the screen in motion across the path of the products of combustion; the preferred arrangement is one in which the speed of movement of the screen is equal to the velocity of the products of combustion. The screen may be rotatably mounted and provided with blades so disposed that the flow of gases from a furnace or engine cylinder causes the rotation of the screen; the screen is preferably cylindrical and arranged so that it communicates at one end with the funnel or discharge passage and the products of combustion enter through the peripheral mesh of said screen. When thus situated the screen may constitute a continuation from the exhaust conduit of the cylinders so that a continuous conduit is formed from the exhaust conduit to the funnel and no products of combustion from the furnace can reach the funnel without passing through the mesh of the screen.

Other features of the invention are hereinafter described and the novel details pointed out in the claims.

Figure 1 is a longitudinal section through a locomotive smoke-box showing the spark arrester in position. Fig. 2 is a similar view of an alternative construction. Figs. 3 and 4 are a section and elevation respectively of the bearing on which the rotary cage is mounted. Fig. 5 is a section of the skeleton frame and bearing. Fig. 6 is an elevation, and Fig. 7 a plan showing one method of mounting the driving blades on the framework. Fig. 8 is an elevation, and Fig. 9 a plan showing an alternative arrangement of fan blades. Fig. 10 is an elevation, and Fig. 11 a plan showing a construction embodying the two arrangements of fan blades.

The spark arrester A as shown in Fig. 1 is mounted in the smokebox B of a locomotive being situated vertically beneath the funnel C. The smokebox is of the ordinary type bounded on one side by the tube plate D in which are mounted the smoke tubes $D^1$ and on the other side by the smoke-box door E by which access is had to the interior of the smoke-box when required.

The exhaust pipe F from the cylinders is led in, in the usual manner at a position beneath the funnel C so as to induce a draft through the fire-box and smoke tubes by the ejector action of the exhaust. On top of the exhaust tube F a ring blower G for high pressure steam is also provided in the usual manner.

An extension $C^1$ of the chimney is provided extending downward into the smokebox and it carries near its lower end an internal cross-piece $C^2$ comprising radial ribs and a central boss $C^3$. This cross-piece is held in place by bolts passing through the member $C^1$.

From the boss $C^3$ there depends a rod $C^4$ as shown in Fig. 3 on which is mounted a sleeve $A^1$ by means of ball bearings $A^2$, $A^3$ which are designed to allow the free rotation of the sleeve $A^1$ on the rod $C^4$ and at the same time to maintain in it the same longitudinal position by taking up any end thrust in either direction. A cap $A^4$ is provided on the lower free end of the sleeve $A^1$ and some form of suitable labyrinth packing $A^5$ to prevent the entry of dust or other deleterious matter into the interior of the sleeve $A^1$ and into the bearings. Preferably these bearings are submerged in a lubricating oil which is suitable for use at the temperatures attained in this portion of the smoke-box. The temperature is not excessively high, because normally the bearing is enveloped in exhaust steam.

On the sleeve $A^1$ is mounted the skeleton frame work of the spark arrester. As shown in Fig. 5 this frame work comprises radial spokes H, H¹ mounted on the sleeve A¹ and connected by longitudinal members H² which also are tied together circumferentially by a top angle-ring H³, a central ring H⁴ and a bottom annular plate H⁵. The parts are so proportioned and disposed that the angle ring H³ has one flange disposed axially within the member C¹ and the other flange disposed radially close to the end of the member C¹; a small clearance is provided to allow the free rotation of the spark arrester and to prevent it getting jammed by particles of soot or cinders.

The top of the exhaust pipe F is fitted with a flange F¹ which lies close to and overlaps the annular plate H⁵ forming the bottom of the framework of the rotating member. These two plates are brought as close together as is convenient to prevent any of the products of combustion entering the spark arrester except in the desired manner. A wire netting or screen A² is secured on this framework to form a complete cylinder through which the products of combustion enter radially; they leave it axially and pass up the funnel.

Referring now to Fig. 6, in this construction a series of fan blades J are mounted between the radial flange of the angle member H³ and the bottom plate H⁵ and the wire netting or screen of the desired mesh is secured outside them as shown in Fig. 2. These fan blades J are so proportioned and adjusted as to be acted upon by the products of combustion entering the spark arrester radially and to drive it at the desired rate. By varying the size or setting of the blades any desired speed of rotation can be obtained.

The preferred arrangement is such that the peripheral velocity of the netting is equal to the velocity of the products of combustion when they enter it under the action of the blower G or exhaust pipe F. In the construction shown in Figs. 9 and 10 the longitudinal blades J are omitted and a set of blades K are mounted radially on the sleeve A¹ in the ordinary propeller form. These blades are acted upon directly by the steam from the exhaust pipe F or the blower G and bring about the desired rotation of the cage.

In the construction shown in Figs. 10 and 11, both sets of fan blades J and K are used simultaneously so that the cage is rotated by the joint action of the steam on the radial fan blades and of the products of combustion on the longitudinal fan blades.

In the constructions shown in Figs. 8 and 10 the products of combustion in addition to the steam act on the fan blades K and produce a driving effect, as they pass outward into the funnel of the locomotive.

It will be appreciated that in any construction in which the products of combustion themselves produce the driving effect on the fan, the speed of rotation of the fan will vary with the quantity of such products as are passing through, that is to say, the speed of the fan varies approximately with the speed of the products of combustion. A similar effect is obtained when the fan is operated by the steam blast which regulates the flow of the products of combustion and if it is desired, a mechanical drive for the spark arrester giving the same proportionality could be obtained by driving it from a fan which produces a draft to regulate the quantity of the products of combustion.

With regard to the mechanical details of this invention, various modifications may be made without departing from the spirit of the invention. Thus, for example, any suitable form of labyrinth packing A³ may be used and it may conveniently be provided with a cavity or grooves filled with some absorbent material such as cork to prevent the entry of water into the interior of the sleeve A¹. Also, instead of filling the sleeve A¹ with lubricating oil, graphite or other lubricant may be used if desired.

The netting or screen is preferably placed outside the longitudinal fan blades J because these blades derive their motion from the action of the gases and therefor have a less linear velocity than have the gases themselves; by arranging the screen at a larger radius, this diminution in linear velocity may be compensated for so that the screen moves at approximately the same speed as the gases themselves.

The mesh of the screen is selected according to the special requirements of any particular case and by making it sufficiently fine the quantity of solid matter escaping through the funnel or chimney may be reduced to any desired extent.

It has heretofore been proposed to provide a spark arrester consisting of a screen through which the products of combustion pass on their way to atmosphere, the screen intercepting the solid particles; this screen was provided with fan blades so that the flow of the exhaust gases caused it to rotate and was arranged to travel across the open end of the exhaust conduit during a portion of its path and during the remaining portion of its path to travel across a hopper so that solid particles received by the screen from the products of combustion were carried across by the movement of the screen to a position above the hopper into which they thereupon fell, being no longer subject to the pressure of the gases flowing through the screen. This screen was disposed at the outer end of the exhaust conduit, but according to the present invention, the screen is situated within a chamber at the inner end of the outlet from which the exhaust is discharged and it will be seen that the present invention differs from the aforesaid known construction, since in the latter case the screen serves the function of a conveyer by which the solid matter is conveyed out of the path of the gases and the screen must be of sufficiently fine mesh to intercept all the solid particles which are not to be allowed to escape.

What we claim as our invention and desire to secure by Letters Patent is:—

1. In a spark arrester, the combination, with a smoke-box provided with an outlet pipe, of a vertical shaft suspended from the outlet pipe and arranged on its axis within the smoke-box, a closed protecting tube inclosing the said shaft and provided with bearings which revolve on the said shaft, a screen carried by the said tube and arranged with its upper end communicating with the said outlet pipe, a blast pipe delivering into the lower part of the said screen, and fan blades for revolving the screen and its supporting tube.

2. In a spark arrester, the combination, with a smoke-box provided with an outlet funnel which projects downwardly into the smoke-box, of a vertical shaft secured upon the axis of the funnel and depending from it, a skeleton frame provided with a central tube which incloses and is journaled on the said shaft, a screen secured to the said frame and arranged with its upper end in communication with the funnel, fan blades operatively connected to the revoluble parts, and a blast pipe arranged to deliver into the lower end of the screen.

In testimony whereof we have affixed our signatures, in presence of two witnesses.

PEDRO CELESTINO SACCAGGIO.
FEDERICO ALEJANDRO LAGRANGE.

Witnesses:
EVAN GRANT,
RALPH WALTER HUNTINGTON.

Copies of this patent may be obtained for five cents each, by addressing the "Commissioner of Patents, Washington, D. C."